ABSTRACT

United States Patent [19]
Idel et al.

[11] 4,316,980
[45] Feb. 23, 1982

[54] PROCESS FOR THE PREPARATION OF TETRAMETHYLATED BISPHENOL POLYCARBONATES

[75] Inventors: Karsten Idel; Volker Serini; Dieter Freitag; Gerd Fengler, all of Krefeld, Fed. Rep. of Germany

[73] Assignee: Bayer Aktiengesellschaft, Leverkusen, Fed. Rep. of Germany

[21] Appl. No.: 112,031

[22] Filed: Jan. 14, 1980

[30] Foreign Application Priority Data

Jan. 17, 1979 [DE] Fed. Rep. of Germany ....... 2901665

[51] Int. Cl.$^3$ ............................................. C08G 63/62
[52] U.S. Cl. .................................... 528/199; 528/125; 528/126; 528/175; 528/184; 528/198; 528/201; 528/202; 528/204
[58] Field of Search ............... 528/199, 198, 125, 175, 528/184, 126, 201, 204, 202

[56] References Cited

U.S. PATENT DOCUMENTS

| | | | |
|---|---|---|---|
| 2,970,131 | 1/1961 | Moyer et al. | 528/196 |
| 2,991,273 | 7/1961 | Hechelhammer et al. | 528/199 |
| 2,999,846 | 9/1961 | Schnell et al. | 528/199 |
| 3,240,756 | 3/1966 | Deanin et al. | 528/199 |
| 3,271,367 | 9/1966 | Schnell et al. | 528/199 |
| 3,271,368 | 9/1966 | Goldberg et al. | 528/199 |
| 3,275,601 | 9/1966 | Schnell et al. | 528/199 |
| 3,517,071 | 6/1970 | Caldwell et al. | 528/199 |
| 3,879,347 | 4/1975 | Serini et al. | 528/199 |
| 3,879,348 | 4/1975 | Serini et al. | 528/199 |
| 3,890,266 | 6/1975 | Serini et al. | 260/37 PC |
| 3,912,687 | 10/1975 | Haupt et al. | 528/199 |
| 4,005,037 | 1/1977 | Mietzsch et al. | 260/4 AR |
| 4,038,252 | 7/1977 | Vernaleken . | |
| 4,105,711 | 8/1978 | Hardt et al. | 260/4 R |
| 4,129,612 | 12/1978 | Serini et al. | 528/199 |

FOREIGN PATENT DOCUMENTS 1122003 7/1968 United Kingdom .
1367790 9/1974 United Kingdom .
1491331 11/1977 United Kingdom .

OTHER PUBLICATIONS

"Chemistry and Physics of Polycarbonates", by Hermann Schnell, Interscience Publishers, 1964, pp. 105, 37 & 38.

Primary Examiner—Harold D. Anderson
Attorney, Agent, or Firm—Gene Harsh; Lawrence S. Pope; Aron Preis

[57] ABSTRACT

The present invention relates to a process for the preparation of thermoplastic, aromatic polycarbonates which contain structural units of the formulae 1 and/or 2

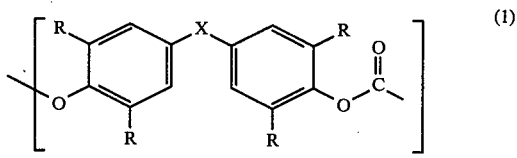

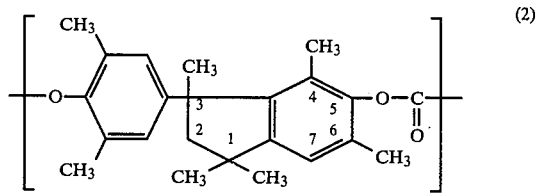

in which
R denotes $C_1$–$C_3$-alkyl, preferably $CH_3$, and
X denotes a single bond, $C_1$–$C_5$-alkylene, $C_2$–$C_5$-alkylidene, cyclohexylene, cyclohexylidene, —O— or —S—.

9 Claims, No Drawings

PROCESS FOR THE PREPARATION OF TETRAMETHYLATED BISPHENOL POLYCARBONATES

The present invention relates to a process for the preparation of thermoplastic, aromatic polycarbonates which contain structural units of the formulae 1 and/or 2

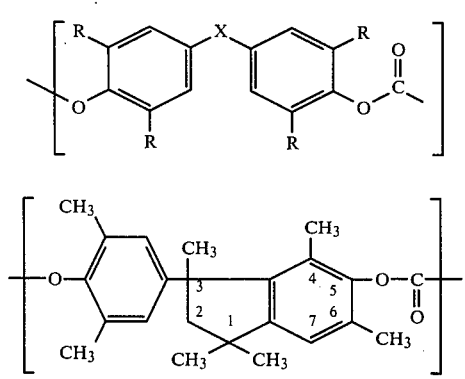

in which

R denotes $C_1$–$C_3$-alkyl, preferably $CH_3$, and

X denotes a single bond, $C_1$–$C_5$-alkylene, $C_2$–$C_5$-alkylidene, cyclohexylene, cyclohexylidene, -O- or -S-, from at least 50 mol %, based on the total molar amount of diphenols employed, of diphenols of the formula 3 and/or 4

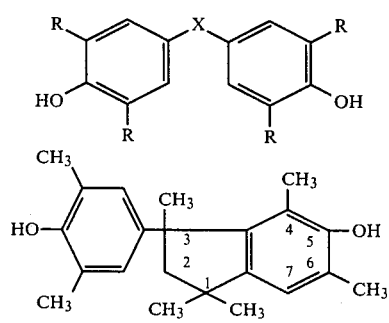

wherein

R and X have the meaning indicated for formula 1, and optionally any other desired diphenols which are not per-substituted by C-substituents in the four ortho-positions relative to the phenolic OH groups, optionally in the presence of chain stoppers and optionally of branching agents, by the phase boundary process in a mixture of an aqueous alkaline phase and an inert organic phase, which is characterised in that the reaction is carried out in the presence of 0.01 to 5 mol %, preferably 0.2 to 2.5 mol %, based on mols of diphenols employed, of quaternary ammonium salts and optionally of an additional 0.1 to 6 mol %, and preferably 0.2 to 5 mol %, based on mols of diphenols employed, of tertiary, preferably tertiary aliphatic, amines, and the total molar amount of ammonium salts and tertiary amines must not exceed 8 mol %, based on mols of diphenols employed, and a reaction time of 0.05 to 3 hours, and preferably 0.1 to 2 hours, must be maintained.

The molar amount of diphenols of the formulae 3 and/or 4 should be at least 50 mol %, preferably at least 80 mol % and in particular at least 90 mol %, based on the total molar amount of mols of diphenols employed. Accordingly, the particular molar amount of the other diphenols is at most 50 mol %, preferably at most 20 mol % and in particular at most 10 mol %.

Other diphenols which are preferentially suitable are those of the formula 3a

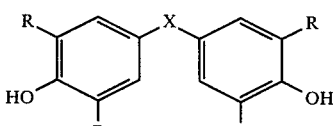

wherein

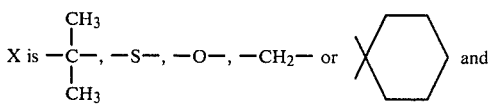

R is H, Br or Cl and the four R substituents can be either identical or different.

The diphenols are reacted by the phase boundary process in a known manner, either in the form of their alkali metal salts or of their chlorocarbonic acid esters of oligocarbonates (pre-phosgenates), which optionally can have chlorocarbonic acid end groups.

When the alkali metal salts, chlorocarbonic acid esters and/or oligocarbonates of the diphenols are used, the abovementioned molar ratios for the reaction of the three types of diphenols are calculated with respect to the molar amounts of diphenols on which these reaction forms are based.

Likewise, the amount of phosgene to be employed in the phase boundary process is also determined, in a known manner, by the additional use of chlorocarbonic acid esters.

Because of the quantitative conversion of the diphenols, the polycarbonates obtainable by the process according to the invention have at least 50 mol %, preferably at least 80 mol % and in particular at least 90 mol %, based on the total molar amount of carbonate structural units, of carbonate structural units of the formula 1 and/or of the formula 2 and, optionally, in each case complementary molar amounts of carbonate structural units which result from the other diphenols employed in the particular case.

The polycarbonates obtainable by the process according to the invention can have any desired degrees of polycondensation P. The process according to the invention enables, in particular, polycarbonates with a P of at least 30 and in particular of at least 40, but also polycarbonates with a P of at least 50, to be synthesized in a simple manner.

The preparation of the high molecular weight polycarbonates, which are built up exclusively or predominantly from carbonate structural units of the formula 1, has hitherto been possible only by a particular process procedure which deviates from the customary processes for the preparation of polycarbonates (see German Offenlegungsschrift No. 1,570,703, German Offenlegungsschrift No. 2,063,050 (Le A 13 359), German Offenlegungsschrift No. 2,063,052 (Le A 13 425), German Offenlegungsschrift No. 2,211,957 (Le A 14 240) and German Offenlegungsschrift No. 2,211,956 (Le A 14 249). However, these processes have the disadvantage that they require relatively large amounts of amines (see, for example, Examples 1 to 4 in German Offenlegungsschrift No. 2,211,957), whilst with the process according to the invention it is possible to manage without the addition of tertiary amines.

U.S. Pat. No. 3,275,601, U.S. Pat. No. 3,517,071 and German Offenlegungsschrift No. 2,615,038 (Le A 16 842) describe the preparation of polycarbonates from o,o',o",o'''-tetraalkyl-substituted diphenols, for which reaction ammonium salts can be used.

However, it cannot be seen from U.S. Pat. No. 3,275,601, column 5, lines 26 et seq. that even small amounts of ammonium salts, optionally in combination with small amounts of amine, suffice for the preparation of high molecular weight polycarbonates from at least 50 mol % of o,o',o",o'''-tetraalkyl-substituted diphenols, whilst if an amine is used on its own, large amounts are required.

It even appears from U.S. Pat. No. 3,517,071, column 20, lines 57–60 and column 22, lines 21-27 that quaternary ammonium salts have a lower catalytic activity than tertiary amines.

German Offenlegungsschrift No. 2,615,038 comprises both polycarbonates containing small proportions of structural units of the formula 2 and polycarbonates containing high proportions, even of up to 100 mol %, of structural units of the formula 2. Accordingly, the large number of processes of preparation cited on page 5, paragraph 2, are to be understood to mean that the methods of preparation given in the German Offenlegungsschriften Nos. 2,063,050, 2,063,052, 1,570,703, 2,211,956 and 2,211,957 already cited above can be used for the preparation of polycarbonates from at least 50 mol % of o,o',o",o'''-tetraalkyl-substituted diphenols, while for the production of polycarbonates having less than 50 mol % of o,o',o",o'''-tetraalkyl-substituted, which polycarbonates are outside the scope of the instant invention any process is in principle suitable, such as the processes described in U.S. Pat. Nos. 3,271,368, 2,991,273, 3,271,367 and 2,999,846, wherein the use of ammonium salts as catalysts is described.

A further advantage of the process according to the invention is that the amount of phosgene required for the preparation of high molecular weight products is less than 170 mol % and in general even less than 150 mol %, based on the mols of diphenols employed in the particular case.

The polycarbonates obtainable by the process according to the invention are, moreover, distinguished by a particularly low content of phenolic end groups, which, as is known, is advantageous in the thermoplastic processing of polycarbonates.

Examples of diphenols of the formula 3 which are to be employed according to the invention are: bis-(3,5-dimethyl-4-hydroxyphenyl)-methane, bis-(3,5-diisopropyl-4-hydroxyphenyl)-methane, 2,2-bis-(3-methyl-5-isopropyl-4-hydroxyphenyl)-propane, 2,2-bis-(3,5-dimethyl-4-hydroxyphenyl)-propane, 2,2-bis-(3,5-diethyl-4-hydroxyphenyl)-propane, 3,3-bis-(3,5-dimethyl-4-hydroxyphenyl)-pentane, 1,1-bis-(3,5-dimethyl-4-hydroxyphenyl)-cyclohexane, 1,4-bis-(3,5-dimethyl-4-hydroxyphenyl)-cyclohexane, bis-(3,5-dimethyl-4-hydroxyphenyl) ether and bis-(3,5-dimethyl-4-hydroxyphenyl)-carbonyl.

The other diphenols which are optionally to be co-condensed with the diphenols of the formulae 3 and/or 4 to be employed according to the invention and which can be any desired diphenols which are not per-substituted by C-substituents in the four ortho-positions relative to the two phenolic OH groups, should preferably contain between 6 and 30 C atoms and in particular be unsubstituted or substituted by halogen in at least one of the four positions which are ortho to the phenolic OH groups.

Examples of these other diphenols are hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl)-sulphoxides, bis-(hydroxyphenyl)-sulphones and α,α'-bis-(hydroxyphenyl)-diisopropylbenzenes.

Preferred examples of these other diphenols are: 2,2-bis-(4-hydroxyphenyl)-propane, 2,2-bis-(4-hydroxyphenyl)-methane, 1,1-bis-(4-hydroxyphenyl)-cyclohexane, 2,2-bis-(3,5-dichloro-4-hydroxyphenyl)-propane, 2,2-bis-(3,5-dibromo-4-hydroxyphenyl)-propane and bis-(4-hydroxyphenyl) sulphide.

These and further corresponding diphenols are described in U.S. Pat. Nos. 3,028,365, 2,999,835, 3,148,172, 3,275,601, 2,991,273, 3,271,367, 3,062,781, 2,970,131 and 2,999,846 and in German Offenlegungsschrift 1,570,703.

Quaternary ammonium salts in which the heteroatom nitrogen can be either in straight-chain or in cyclic systems are suitable according to the invention. Examples of suitable ammonium salts are those with 4 to 50 C atoms and 1 to 3 N atoms, such as, say: tetramethylammonium bromide, tetraethylammonium chloride, tetraethylammonium bromide, tetra-n-propylammonium bromide, tetra-n-butylammonium bromide, tetra-n-butylammonium iodide, tetra-n-hexylammonium bromide, tetra-n-octylammonium bromide, tetra-n-decylammonium bromide, trioctyl-methyl-ammonium sulphate, trioctyl-methyl-ammonium iodide, N-methyl-N-decylmorpholinium bromide, N-methyl-N-butylmorpholinium bromide, N-methyl-N-octylmorpholinium bromide, N-methyl-N-cetylmorpholinium bromide, N-methyl-N-benzylmorpholinium bromide, N-methylbenzylmorpholinium chloride, N-methyl-N-ethylmorpholinium chloride, N-methyl-N-ethylpyrrolidinium bromide, N-methyl-N-butylpyrrolidinium bromide, N-methyl-N-cetylpyrrolidinium bromide, N-methyl-N-octylpyrrolidinium bromide, N-methyl-N-benzylpyrrolidinium chloride, N-(2-hydroxyethyl)-N-ethylpiperidinium bromide, N-(2-hydroxyethyl)-N-butylpiperidinium bromide, N-(2-hydroxyethyl)-N-octylpiperidinium bromide, N-(2-hydroxyethyl)-N-benzylpiperidinium chloride, tripropylhexylammonium bromide, tripropylcetylammonium bromide, N-ethyl-N-butyl-piperidinium bromide, tricyclohexylethylammonium bromide, benzyltributylammonium bromide, benzyltrimethylammonium chloride, hexadecylpiperidinium chloride, hexadecyltrimethylammonium bromide, phenyltrimethylammonium bromide, tetrabutylammonium hydrogensulphate, tetraethylammonium hydrogensulphate, tetraethylammonium-4-toluenesulphonate, tetradecylammonium perchlorate and tricaprylmethylammonium bromide.

Tertiary amines which are suitable for the process according to the invention can be either cyclic or open-chain. Aliphatic tertiary amines, for example those with 1 or 2 N atoms and 3 to 24 C atoms, are preferentially suitable. The following amines may be mentioned as examples: trimethylamine, triethylamine, tributylamine, trihexylamine, dimethylbenzylamine, triethylenediamine, tetramethylethylenediamine, permethyldiethylenetriamine, N,N-dimethylcyclohexylamine, N-ethylpiperidine, 1,4-dimethylpiperazine, 4-methyl-morpholine, 4,4'-(1,2-ethanediyl)-bis-morpholine and 1,2-diazabicyclo(2,2,2)octane.

The ammonium salts, or mixtures thereof with tertiary amines, which are to be employed according to the invention can be added before, during or after the phosgenation reaction and the combined use of ammonium salts and tertiary amines also makes separate metering possible, for example the addition of the ammonium salts before the phosgenation reaction and the addition of tertiary amines after the phosgenation reaction.

Chain stoppers which can be used for the process according to the invention are the chain stoppers customary in polycarbonate chemistry, preferably monophenols, such as, for example, phenol, p-tert.-butyl-phenol, p-methyl-phenol, 2,6-dimethylphenol, nonyl-phenol, p-chlorophenol, p-bromophenol and 2,4,6-tribromophenol.

The amounts of chain stoppers are between 0.2 and 10.0 mol % and preferably between 1.0 and 5.0 mol %, based on the mols of diphenols employed in the particular case.

Aqueous alkali or aqueous alkaline earth, preferably aqueous alkali and in particular aqueous NaOH or aqueous KOH, is used as the aqueous alkaline phase for the phase boundary process. The pH values of the aqueous phase should be between 11 and 14 during the preparation of the polycarbonate.

The polycarbonate solvents which, in a known manner, are immiscible with water and inert under the reaction conditions for the preparation of polycarbonates, such as, for example chlorinated aliphatic hydrocarbons, such as $CH_2Cl_2$, $CHCl_3$ and 1,2-dichloroethane, or chlorinated aromatic hydrocarbons, such as chlorobenzene, dichlorobenzene and chlorotoluene, are used as the inert organic phase.

With the process according to the invention, the polycarbonate concentration in the organic phase after the polycondensation reaction has ended is 18 to 50% by weight and preferably 22 to 35% by weight, in each case calculated for the weight of polycarbonate per total weight of organic phase.

The ratio of the volumes of organic phase to aqueous phase after the polycondensation reaction has ended should be between 5:1 and 1:1.2 and preferably between 2.5:1 and 1.25:1.

The volumes of the organic and of the aqueous phase are understood as meaning the volumes which the phases possess after the polycondensation reaction. The organic phase then thus comprises the organic solvent and the polycarbonate dissolved therein and the aqueous phase then comprises the water, the salts formed and the excess alkali.

The reaction temperature is between 0° and 80° C. and preferably between 10° and 40° C.

The process according to the invention can be varied by the customary additional use of branching agents. Suitable branching agents are compounds which have three or more than three functional groups and in particular three or four functional groups, the functional groups of these compounds reacting with phosgene, chlorocarbonic acid ester end groups or bis-phenolates with joining of a chemical bond. The amounts of branching agent to be employed are from 0.05 to 2 mol %, based on the mols of diphenols employed in the particular case.

Suitable branching agents are, for example, polyhydroxy compounds with three or more than three phenolic hydroxyl groups.

Branching components which can be used are the compounds described in German Offenlegungsschriften Nos. 1,570,533, 1,595,762, 2,116,974, 2,113,347 and 2,500,924, British Pat. No. 1,079,821 and U.S. Pat. No. 3,544,514. Some of the compounds having three or more than three phenolic hydroxyl groups which can be used are, for example, phloroglucinol, 4,6-dimethyl-2,4,6-tri-(4-hydroxyphenyl)-hept-2-ene, 4,6dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methyl-phenol, 2-(4-hydroxyphenyl)-2-(2,4-dihydroxyphenyl)-propane and 1,4-bis-(4,4'''-dihydroxytriphenyl-methyl)-benzene.

Some of the other trifunctional compounds are trimesic acid trichloride, cyanuric chloride, 3,3-bis-(4-hydroxyphenyl)-2-oxo-2,3-dihydroindole and 3,3-bis-(4-hydroxy-3-methylphenyl)-2-oxo-2,3-dihydroindole.

The organic polycarbonate solution obtained by the process according to the invention is optionally neutralised and washed until free from electrolyte. The polycarbonate is isolated from this purified solution by known processes, for example by concentrating the organic solution and evaporating the residual solvent in vacuo or by mixing the polycarbonate solution with an organic solvent, for example methanol, which, although it is soluble in the polycarbonate solvent of the polycarbonate solution, is not a solvent for the dissolved polycarbonate.

The high molecular weight polycarbonates prepared by the process according to the invention are, as also already described in German Offenlegungsschriften Nos. 2,063,050, 2,063,052 and 2,615,038, high quality plastics which can readily be processed to films and mouldings. They are also suitable for use in mixtures with fillers, such as, for example, minerals, carbon black, glass fibres and pigments, and also additives such as stabilisers against the influence of oxygen, heat and UV light, mould-release agents and flame-retardant additives, such as, for example, halogen compounds, sulphur compounds, phosphorus compounds and antimony compounds and salts of inorganic or organic acids, for example the sodium salt of perfluorinated butanesulphonic acid.

The excellent resistance to solvolysis, and especially to hydrolysis, of the polycarbonates accessible by the process according to the invention is outstanding. In addition, these polycarbonates have an outstanding heat distortion resistance. In general, they possess glass transition temperatures of above 160° C. The polycarbonates are to be employed with great advantage especially in those cases where the demand is for resistance to high temperatures and for resistance to hydrolysis, saponification and aminolysis. Thus, they can be used, for example, to produce pipelines for hot alkaline or acid solutions, high-grade seals for utensils and equipment which can be sterilised with superheated steam. Because of the good solubility in solvents such as toluene and xylene, they can also be used as lacquers, for example for coating plastics.

A further possibility for use of the polycarbonates prepared by the process according to the invention lies in admixture of these with other polymers, such as is described, for example, in German Offenlegungsschriften Nos. 2,402,175, 2,402,176, 2,402,177 and 2,248,817.

Thus, the polycarbonates according to the invention (see also German Offenlegungsschrift No. 2,248,817) are homogeneously miscible in all proportions with other high molecular weight aromatic polycarbonates, especially those based on bisphenol A or tetrahalogenobisphenol A and mixtures thereof.

The polycarbonates of the invention can also be modified with vinyl chloride polymers which contain at least 70% by weight of vinyl chloride and up to 30% of other copolymerisable vinyl monomers, the vinyl polymer being polymerised direct from the vinyl monomers in the presence of the polycarbonate, or the finished vinyl polymer being admixed with the polycarbonate. In addition, up to 100% by weight of rubber or rubber-modified thermoplastic resins can also be mixed into the polycarbonate/vinyl chloride polymer.

EXAMPLE 1

15.37 kg of triply demineralised water are flushed with nitrogen. 5.94 kg of 45% strength sodium hydroxide solution are then added. Whilst continuing to pass in nitrogen, 4.25 kg of 3,3-bis-(3,5-dimethyl-4-hydroxyphenyl)-propane are added and the mixture is left until everything has dissolved. 15.00 kg of methylene chloride (not stabilised), 3.15 kg of chlorobenzene, 39.50 kg of phenol (2.8 mol % always based on the amounts of bisphenol), 58.00 g (1.2 mol %) of tetrabutylammonium bromide and 33.40 g (1.2 mol %) of tributylamine are then added. 2.25 kg of phosgene are then passed in at room temperature in the course of 60 minutes, or phosgene is passed in until no further free bisphenol can be detected in the aqueous phase. After a post-condensation time of 1 hour, the organic phase is separated off and acidified. It is then washed with triply demineralised water until free from electrolyte, the organic phase is dried and the polycarbonate according to the invention is isolated by distilling off the solvent.

A high molecular weight polycarbonate with the following characteristics is isolated:

$\eta_{rel}$ = 1.272 (relative solution viscosity 0.5 g/100 ml, measured in methylene chloride)

$M_{LS}$ = 34000 (mean molecular weight determined from light scattering measurements)

$T_G$ = 201° (differential thermal analysis)

If the batch is worked up in the above manner directly after the end of the phosgenation stage, a polycarbonate is obtained which has an $\eta_{rel}$ of 1.252. This shows the rapid build-up even in the phosgenation phase.

EXAMPLE 2

Comparison example according to German Offenlegungsschrift 2,063,050 with triethylamine as the sole catalyst.

28.0 g of sodium hydroxide, 56.8 g (0.2 mol) of 3,3-bis-(3,5-dimethyl-4-hydroxyphenyl)-propane and 0.507 g (2.7 mol %) of phenol are dissolved in 600 ml of triply demineralised water. 600 ml of methylene chloride are then added, whilst stirring. Whilst stirring vigorously, 40 g of phosgene are passed in, the pH value of the aqueous phase being kept at 13 during the addition. A further 32.0 g of sodium hydroxide in aqueous solution and 4 ml (14 mol %) of triethylamine are then metered in. The mixture is allowed to react for a further 2.5 hours under nitrogen, at room temperature. Working up is carried out analogously to Example 1. A polycarbonate results which has an $\eta_{rel}$ of 1.274, a $M_{LS}$ of 34200 and a glass transition temperature of 201° C.

Compared with Example 1, a considerably greater molar amount of catalyst is required in this case.

EXAMPLE 3

Preparation of a high molecular weight polycarbonate based on the bis-chlorocarbonic acid ester of 3,3-bis-(3,5-dimethyl-4-hydroxyphenyl)-propane: 81.8 g of the bis-chlorocarbonic acid ester of 3,3-bis-(3,5-dimethyl-4-hydroxyphenyl)-propane in 250 ml of unstabilised methylene chloride are added to the following solution whilst stirring well: 41.6 g of sodium hydroxide in 300 ml of triply demineralised water and 0.507 g (2.7 mol %) of phenol, 0.556 g (1.5 mol %) of tributylamine and 0.966 g (1.5 mol %) of tetrabutylammonium bromide.

The mixture is allowed to react for a further 1 hour at 20°–25° C. After this time no further free bisphenol can be detected in the reaction mixture. The organic phase is separated off, diluted with 500 ml of methylene chloride and washed twice with 1% strength phosphoric acid. The organic solution of the polycarbonate is then washed until free from electrolyte. By stirring the methylene chloride solution of the polycarbonate into methanol, a white, flocculent polycarbonate is precipitated.

$\eta_{rel}$ of the polycarbonate: 1.262

EXAMPLE 4

Preparation of a polycarbonate based on 3,3-bis-(3,5-dimethyl-4-hydroxyphenyl)-propane without amine catalysis and only with phase transfer catalysis with 1.5 mol % of tetrabutylammonium bromide:

The sample weights and course of reaction are analogous to Example 1 except that only 72.5 g (1.5 mol %) of tetrabutylammonium bromide are employed in place of the mixture of 58 g (1.2 mol %) of tetrabutylammomium bromide and 33.4 g (1.2 mol %) of tributylamine. After working up analogously in Example 1, a polycarbonate is obtained which has a solution viscosity of $\eta_{rel}$ = 1.246

TABLES 1, 2 AND 3

In Table 1 which follows, the influence of different amounts of tetrabutylammonium bromide in the amine-free catalysis on the preparation of the polycarbonate according to Example 4 is illustrated. The build-up of the high molecular weight polycarbonate is followed by measuring the solution viscosity.

TABLE 1

| $^x$Mol % of tetra-butylammonium bromide | $\eta_{rel}$ after a post-condensation time of | | |
|---|---|---|---|
| | 1 hour | 2 hours | 3 hours |
| 1 | 1.202 | 1.218 | 1.220 |
| 2 | 1.246 | 1.249 | 1.256 |
| 3 | 1.335 | 1.385 | 1.395 |
| 4 | 1.405 | 1.436 | 1.436 |
| 5 | 1.421 | 1.429 | 1.440 |

$^x$Mol %, based on the amounts of bisphenol

In Table 2 the differences in the influence of substituents in quaternary ammonium salts on the catalytic effect in the preparation of the polycarbonate according to Example 4 is illustrated. In addition it can be seen that the high-molecular build-up is virtually completed after a post-condensation time of 1 hour.

TABLE 2

| 1.0 mol % of catalyst | after a post-condensation time of | | |
|---|---|---|---|
| | 1 hour | 2 hours | 3 hours |
| $(C_2H_5)_3-N^{\oplus}-CH_2-C_6H_5 \ Cl^{\ominus}$ | 1.192 | 1.203 | 1.212 |
| $(C_2H_5)_3-N^{\oplus}-C_{16}H_{33} \ Br^{\ominus}$ | 1.238 | 1.245 | 1.246 |
| $(C_4H_9)_3N^{\oplus}CH_3 \ Br^{\ominus}$ | 1.246 | 1.249 | 1.256 |
| $(C_6H_{13})_4N^{\oplus} \ Br^{\ominus}$ | 1.248 | 1.252 | 1.258 |
| $(C_{10}H_{21})_3N^{\oplus}CH_3 J^{\ominus}$ | 1.201 | 1.202 | 1.198 |
| $(C_2H_5)_2N^{\oplus}(C_6H_{13})_2 \ Br^{-\ominus}$ | 1.213 | 1.215 | 1.209 |
| $(C_8H_{17})_3N^{\oplus}CH_3^{\ominus}SO_4CH_3$ | 1.241 | 1.240 | 1.245 |
| $(C_2H_5)_2N^{\oplus}[(CH_2)_2]_2(CH_2)_2-N^{\oplus}(C_2H_5)_2 \cdot 2Br^{\ominus}$ (DABCO-type, diethyl) | 1.200 | 1.298 | 1.207 |
| $(C_8H_{17})N^{\oplus}[(CH_2)_2]_2(CH_2)_2-N^{\oplus}(C_8H_{17})_2 \cdot 2Br^{\ominus}$ | 1.183 | 1.185 | 1.192 |
| Pyridinium-$N^{\oplus}C_2H_5 \ Br^{\ominus}$ | — | 1.038 | 1.045 |
| Morpholinium-$N^{\oplus}(CH_3)(C_4H_9) \ Br^{\ominus}$ | 1.192 | 1.198 | 1.198 |
| Pyrrolidinium-$N^{\oplus}(CH_3)(C_2H_5) \ Br^{\ominus}$ | 1.083 | 1.112 | 1.125 |
| Pyrrolidinium-$N^{\oplus}(CH_3)(C_{16}H_{33}) \ Br^{\ominus}$ | 1.201 | 1.208 | 1.211 |
| Morpholinium-$N^{\oplus}(CH_2CH_2OH)(C_4H_9) \ Br^{\ominus}$ | 1.238 | 1.242 | 1.246 |
| Morpholinium-$N^{\oplus}(CH_2CH_2OH)(C_3H_{17}) \ Br^{\ominus}$ | 1.212 | 1.216 | 1.216 |
| Morpholinium-$N^{\oplus}(CH_2CH_2OH)(C_{16}H_{33}) \ Br^{\ominus}$ | 1.217 | 1.228 | 1.236 |
| Piperidinium-$N^{\oplus}(C_2H_5)(C_{16}H_{33}) \ Br^{\ominus}$ | 1.237 | 1.242 | 1.243 |
| $CH_3^{\oplus}-N(CH_3)(C_4H_9)-CH_2-CH_2-{}^{\oplus}N(CH_3)(C_4H_9)-CH_2-CH_2-{}^{\oplus}N(CH_3)(C_4H_9)-CH_3 \cdot 3Br^{\ominus}$ | 1.206 | 1.209 | 1.205 |
| $CH_3-{}^{\oplus}N(CH_3)(C_8H_{17})-CH_2-CH_2-{}^{\oplus}N(CH_3)(C_8H_{17})-CH_2-CH_2-{}^{\oplus}N(CH_3)(C_8H_{17})-CH_3 \cdot 3Br^{\ominus}$ | 1.208 | 1.217 | 1.222 |
| $(C_4H_9)_2-{}^{\oplus}N(C_{13}H_{37})-CH_2-CH_2-OH \ Br^{\ominus}$ | 1.232 | 1.238 | 1.230 |

TABLE 2-continued

| 1.0 mol % of catalyst | after a post-condensation time of | | |
|---|---|---|---|
| | 1 hour | 2 hours | 3 hours |
| 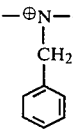 | 1.212 | 1.219 | 1.225 |

In Table 3 the influence of the tertiary amine as a co-catalyst in the preparation of the polycarbonate according to Example 1 is illustrated.

TABLE 3

| Mol % of tetra-butylammonium bromide | Mol % of tributyl-amine | $\eta_{rel}$ after a condensation time of | | |
|---|---|---|---|---|
| | | 1 hour | 2 hours | 3 hours |
| 0.25 | 0.25 | 1.058 | 1.065 | 1.072 |
| 0.5 | 0.5 | 1.218 | 1.218 | 1.225 |
| 1.0 | 1.0 | 1.242 | 1.246 | 1.248 |
| 1.5 | 1.5 | 1.282 | 1.285 | 1.309 |
| 2.0 | 2.0 | 1.352 | 1.364 | 1.379 |

The examples listed in Tables 1–3 demonstrate the short reaction times and the small amounts of catalyst for the process according to the invention and also the possibility of obtaining high molecular weight polycarbonates within a short time merely by using small amounts of ammonium salt, entirely without amine catalysis.

EXAMPLE 5

3,500 g of water are flushed with nitrogen gas. 456 g (11.4 mols) of NaOH, 322 g (1.0 mol) of 1,1,3,4,6-pentamethyl-3-(3,5-dimethyl-4-hydroxyphenyl)-indan-5-ol and 2.16 g of phenol (2.3 mol % based on the bisphenol component) are then dissolved in the indicated order.

After adding 2,500 g of methylene chloride, 4.80 g (1.5 mol %) of tetrabutylammonium bromide are also metered in and 190 g of phosgene is then passed in at pH 13–14 in the course of 1 hour, at room temperature. The mixture is stirred for a further 2 hours and worked up as in Example 1. Solution viscosity of the polycarbonate: $\eta_{rel}$ 1.295.

Copolycarbonates based on 3,3-bis-(3,5-dimethyl-4-hydroxyphenyl)-propane (tetramethylbisphenol A) and 1,1,3,4,6-pentamethyl-3-(3,5-dimethyl-4-hydroxyphenyl)-indan-5-ol (tetramethylindane-bisphenol), and also other bisphenols, can also be prepared easily by the process according to the invention, for example according to Example 5:

| Mol % of tetra-methyl-bisphenol A | Mol % of tetra-methylindane-bisphenol | Mol % of catalyst tetrabutylammonium bromide (TBAB) tributylamine (TBA) | $\eta_{rel}$ |
|---|---|---|---|
| 40 | 60 | 2 mol % of TBAB | 1.254 |
| 80 | 20 | 1 mol % of TBAB/ 1 mol % of TBA | 1.267 |
| 95 | 5 | 1 mol % of TBAB/ 1 mol % of TBA | 1.287 |
| 5 | 95 | 1.5 mol % of TBAB/ 1.5 mol % of TBA | 1.325 |

EXAMPLE 6

Polycarbonate from 2,2-bis-(3,5-dimethyl-4-hydroxyphenyl)-propane; catalysis by tetrabutylammonium bromide alone during the phosgenation stage.

284.4 g (1 mol) of 2,2-bis-(3,5-dimethyl-4-hydroxyphenyl)-propane and 2.8 g (0.03 mol) of phenol are dissolved in 449 ml of distilled water and 137.4 ml of 50% strength sodium hydroxide solution (2.62 mols of NaOH), whilst passing $N_2$ through the mixture and stirring. After adding 745 ml of methylene chloride, 224 ml of chlorobenzene and 3.22 g (0.01 mol) of tetra-n-butyl-ammonium bromide, 106.8 g (1.08 mol) of phosgene in the gas form are passed in in the course of 15 minutes at a constant rate, whilst stirring. 5.53 ml (0.04 mol) of triethylamine are then added and the mixture is stirred for a further 30 minutes. The temperature is kept at 25°–30° C. while the phosgene is being passed in and during the subsequent stirring period. After passing in the phosgene and after the subsequent stirring period, the alkaline aqueous phase is free from bisphenolate. The polycarbonate formed is worked up after acidifying the batch with phosphoric acid, by washing the organic phase, which is separated off, with distilled water until free from electrolyte, and the polycarbonate is obtained by evaporating the organic phase and drying.

The following analytical data are obtained for the polycarbonate:

Relative viscosity $\eta_{rel} = 1.28$
phenolic OH end groups 0.006%
saponifiable chlorine (from chlorocarbonic acid ester end groups) less than 20 ppm.

EXAMPLE 7

Polycarbonate from 2,2-bis-(3,5-dimethyl-4-hydroxyphenyl)-propane; catalysis by tetrabutylammonium bromide alone during the phosgenation stage.

284.4 g of 2,2-bis-(3,5-dimethyl-4-hydroxyphenyl)-propane and 3.8 g (0.04 mol) of phenol are dissolved in 971 ml of distilled water and 283 ml of 50% strength sodium hydroxide solution (5.4 mols of NaOH) whilst passing $N_2$ through the mixture. After adding 745 ml of methylene chloride, 224 ml of chlorobenzene and 4.8 g (0.015 mol) of tetra-n-butyl-ammonium bromide, 158 g (1.6 mols) of phosgene are passed in in the course of 15 minutes at a constant rate. 2.8 ml (0.02 mol) of triethylamine are then added and the mixture is stirred for a further 15 minutes. The temperature is kept at 25°–30° C. while passing in the phosgene and during the subsequent stirring period. After passing in the phosgene and after the subsequent stirring period, the alkaline aqueous phase is free from bisphenolate. The polycarbonate formed is worked up after acidifying the organic phase, which has been separated off, with phosphoric acid, by washing the organic phase with distilled water until free from electrolyte, and the polycarbonate is obtained by evaporating the organic phase and drying.

The following analytical data are obtained for the polycarbonate:

Relative viscosity—$\eta_{rel} = 1.27$
phenolic OH end groups—0.007%
saponifiable chlorine (from chlorocarbonic acid ester end groups) less than 20 ppm

EXAMPLE 8

Polycarbonate from 2,2-bis-(3,5-dimethyl-4-hydroxyphenyl)-propane; catalysis by tetrabutylammonium bromide and triethylamine during the phosgenation stage.

284.4 g of 2,2-bis-(3,5-dimethyl-4-hydroxyphenyl)-propane and 2.8 g (0.03 mol) of phenol are dissolved in 971 ml of distilled water and 283 ml of 50% strength sodium hydroxide solution (5.4 mols of NaOH), whilst passing $N_2$ through the mixture. After adding 745 ml of methylene chloride, 224 ml of chlorobenzene, 4.8 g (0.015 mol) of tetra-n-butyl-ammonium bromide and 0.7 ml (0.005 mol) of triethylamine, 158 g (1.6 mols) of phosgene are passed in in the course of 15 minutes at a constant rate. The mixture is then stirred for a further 15 minutes. The temperature is kept at 25°–30° C. while passing in the phosgene and during the subsequent stirring period. After passing in the phosgene and after the subsequent stirring period, the alkaline aqueous phase is free from bisphenolate. The polycarbonate formed is worked up as in Example 1.

The following analytical data are obtained for the polycarbonate:

Relative viscosity—$\eta_{rel} = 1.27$
saponifiable chlorine (from chlorocarbonic acid ester end groups) less than 20 ppm Examples 6–8 show that by means of the catalysis according to the invention short reaction times are possible, that the amounts of phosgene required are small and that the polycarbonate possesses few OH end groups.

We claim:

1. A process for the preparation of a thermoplastic aromatic polycarbonate having a degree of polymerization of at least 30 comprising recurring structural units selected from the group consisting of

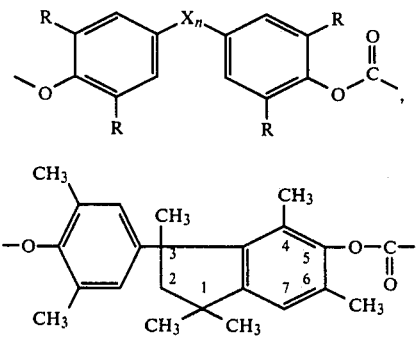

and mixtures thereof
wherein
R denotes $C_1$ alkyl,
X denotes $C_1$–$C_5$ alkylene, $C_2$–$C_5$ alkylidene, cyclohexylene, cyclohexylidene, —O—, or —S—, and
n is either 0 or 1, comprising reacting at least 80 mol percent, relative to the total molar amount of diphenols, of a diphenol of the formula

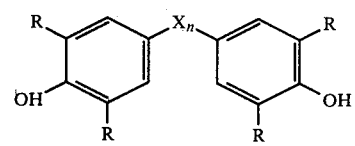

or

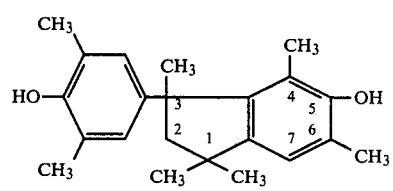

or mixtures thereof wherein R, X and n have the meanings indicated above, by the phase boundary process in a mixture of an aqueous alkaline phase and an inert organic phase in the presence of a catalyst consisting of 0.2 to 2.5 mol percent relative to said total amount of diphenols employed of at least one quaternary ammonium salt, at a reaction time of 0.1 to 2 hours, and a reaction temperature between 10° and 40° C.

2. The process of claim 1 wherein said total molar amount of diphenols comprise at least one diphenol which is not per-substituted by C-substituents in the four ortho-positions relative to the phenolic OH groups.

3. The process of claim 1 wherein at least one chain stopper employed in said reaction.

4. The process of claim 1 wherein at least one branching agent employed in said reaction.

5. The process of claim 1 wherein said diphenol of formula III or IV or mixtures thereof comprise at least 90 mol percent relative to said amount of diphenols.

6. The process of claim 1 wherein said denotes $C_2$–$C_5$-alkylidene.

7. The process of claim 1 wherein said total amount of diphenols employed comprise diphenols of the structural formula

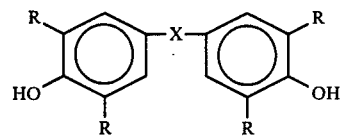

wherein X denotes

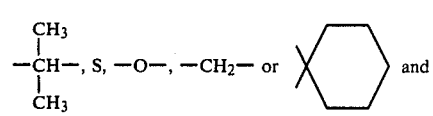

R independently denotes H, Br or Cl.

8. A process for the preparation of a thermoplastic aromatic polycarbonate having a degree of polymerization of at least 30 comprising recurring structural units selected from the group consisting of

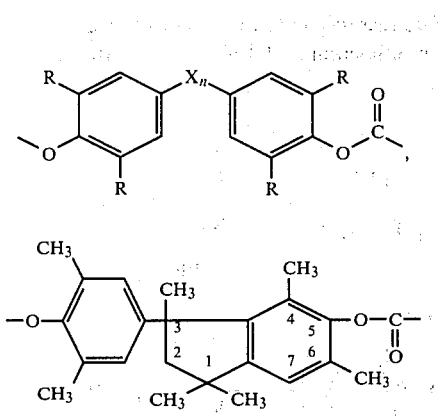

and mixtures thereof
wherein
R denotes $C_1$ alkyl,
X denotes $C_1-C_5$ alkylene, $C_2-C_5$ alkylidene, cyclohexylene, cyclohexylidene, —O—, or —S—, and
n is either 0 or 1,
comprising reacting at least 80 mol percent, relative to the total molar amount of diphenols, of a diphenol of the formula

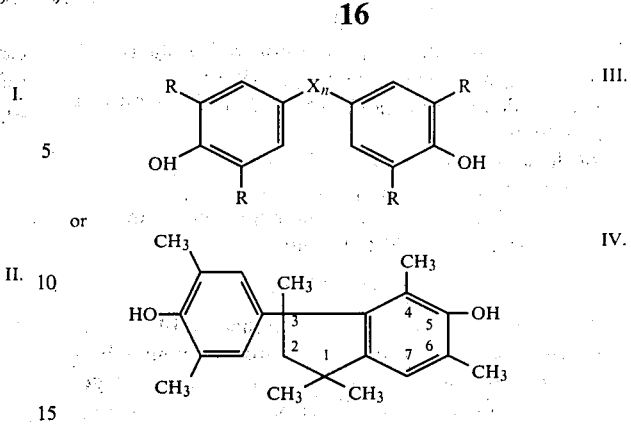

or mixtures thereof
wherein R, X and n have the meanings indicated above, by the phase boundary process in a mixture of an aqueous alkaline phase and an inert organic phase in the presence of a catalyst consisting of 0.2 to 2.5 mol percent of at least one quaternary ammonium salt and 0.2 to 5 mol percent of at least one tertiary amine, both quantities in relation to the total amount of diphenols employed at a reaction time of 0.1 to 2 hours, and a reaction temperature beteen 10° and 40° C.

9. The process of claim 8 wherein said tertiary amine is aliphatic.

* * * * *